United States Patent
Kim et al.

(10) Patent No.: US 10,581,656 B2
(45) Date of Patent: Mar. 3, 2020

(54) METHOD FOR CONFIGURING REFERENCE SIGNAL FOR V2V COMMUNICATION IN WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Hanbyul Seo, Seoul (KR); Inkwon Seo, Seoul (KR)

(73) Assignee: LG Electronics Inc., Seoul (KR)

(*) Notice: Subject to any disclaimer, the term of this patent is extended or adjusted under 35 U.S.C. 154(b) by 18 days.

(21) Appl. No.: 15/579,020

(22) PCT Filed: Jun. 3, 2016

(86) PCT No.: PCT/KR2016/005900
§ 371 (c)(1),
(2) Date: Dec. 1, 2017

(87) PCT Pub. No.: WO2016/195411
PCT Pub. Date: Dec. 8, 2016

(65) Prior Publication Data
US 2018/0145857 A1  May 24, 2018

Related U.S. Application Data

(60) Provisional application No. 62/170,656, filed on Jun. 3, 2015.

(51) Int. Cl.
*H04W 4/00* (2018.01)
*H04L 27/26* (2006.01)
(Continued)

(52) U.S. Cl.
CPC ........ *H04L 27/2613* (2013.01); *H04L 5/0048* (2013.01); *H04L 5/0055* (2013.01);
(Continued)

(58) Field of Classification Search
CPC ............... H04L 27/2613; H04L 5/0055; H04L 27/2675; H04L 5/0048; H04L 5/0007; H04W 4/44; H04W 4/46; H04W 4/025
(Continued)

(56) References Cited

U.S. PATENT DOCUMENTS

| 2015/0016431 A1 | 1/2015 | Ranta-Aho et al. |
| 2017/0142741 A1* | 5/2017 | Kaur .................. H04W 56/002 |

FOREIGN PATENT DOCUMENTS

| WO | 2013/066126 A1 | 5/2013 |
| WO | 2014/165411 A1 | 10/2014 |

(Continued)

*Primary Examiner* — Mang Hang Yeung
(74) *Attorney, Agent, or Firm* — Dentons US LLP

(57) ABSTRACT

The present invention relates to a method for receiving and configuring a reference signal of a vehicle-to-vehicle (V2V) device for V2V communication in a wireless communication system. Particularly, the method comprises the steps of: performing synchronization with a first synchronization source having a frequency for dedicated short range communication (DSRC) as a center frequency; and receiving, from the first synchronization source, a reference signal on an orthogonal frequency division multiplexing (OFDM) symbol configured according to a reference signal configuration, wherein the reference signal configuration is defined for frequency correction according to a hop sync of the center frequency.

6 Claims, 21 Drawing Sheets

(51) Int. Cl.
*H04W 4/44* (2018.01)
*H04L 5/00* (2006.01)
*H04W 4/46* (2018.01)
*H04W 4/02* (2018.01)

(52) U.S. Cl.
CPC ........... *H04L 27/2675* (2013.01); *H04W 4/44* (2018.02); *H04W 4/46* (2018.02); *H04L 5/0007* (2013.01); *H04W 4/025* (2013.01)

(58) Field of Classification Search
USPC ........................................................ 370/329
See application file for complete search history.

(56) References Cited

FOREIGN PATENT DOCUMENTS

| WO | 2014/196741 A1 | 12/2014 |
| WO | 2015/030548 A1 | 3/2015 |

\* cited by examiner

FIG. 2
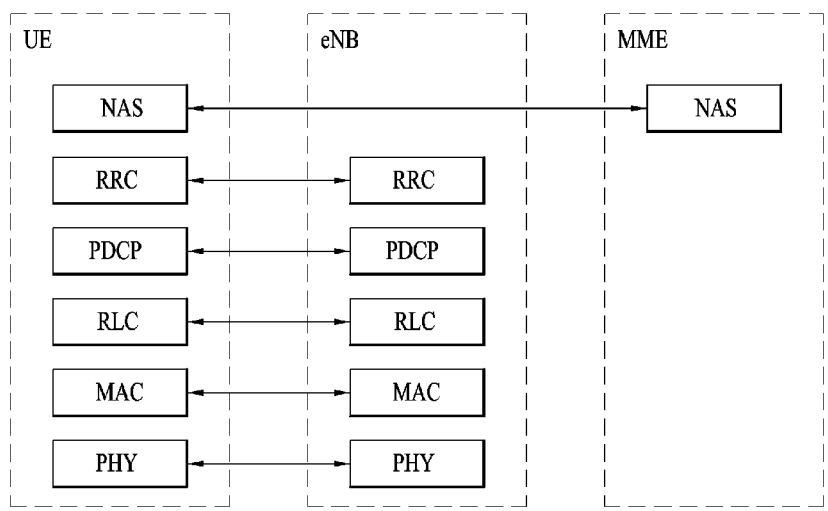
(a) Control-plane protocol stack
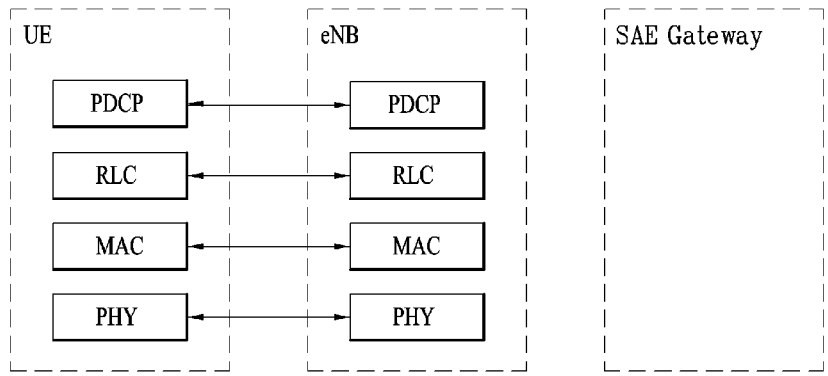
(b) User-plane protocol stack FIG. 8
(a) 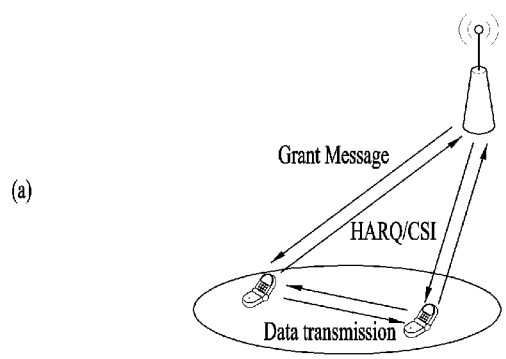
(b) 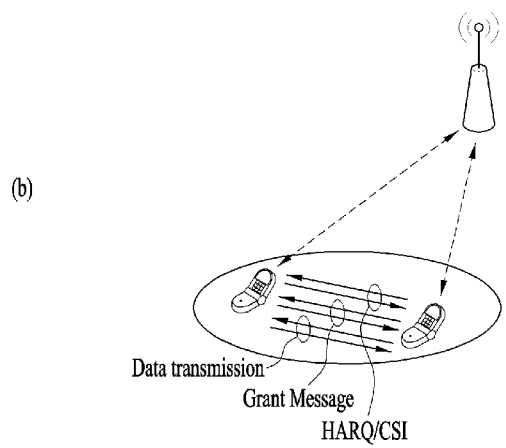

METHOD FOR CONFIGURING REFERENCE SIGNAL FOR V2V COMMUNICATION IN WIRELESS COMMUNICATION SYSTEM, AND APPARATUS THEREFOR

This application is a National Stage Application of International Application No. PCT/KR2016/005900, filed on Jun. 3, 2016, which claims the benefit of U.S. Provisional Application No. 62/170,656, filed on Jun. 3, 2015, all of which are hereby incorporated by reference in their entirety for all purposes as if fully set forth herein.

TECHNICAL FIELD

The present invention relates to a wireless communication system, and more particularly, to a method of configuring a reference signal for V2V communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the present invention intends to propose a method of configuring a reference signal for V2V communication in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a reference signal, which is received by a V2V device to perform V2V (vehicle-to-vehicle) communication in a wireless communication system, includes the steps of performing synchronization with a first synchronization source having a frequency for performing DSRC (dedicated short range communication) as a center frequency, and receiving a reference signal on an OFDM (orthogonal frequency division multiplexing) symbol, which is configured according to a reference signal configuration, from the first synchronization source. In this case, the reference signal configuration can be defined for frequency compensation according to a hop sync of the center frequency.

Preferably, the reference signal configuration can deploy a reference signal having a length of a half-OFDM symbol to make the reference signal have the same interval in a subframe.

Preferably, the reference signal configuration can deploy a reference signal having a length of a half-OFDM symbol to make the reference signal have the same interval in a slot. More preferably, the reference signal configuration can configure a reference signal interval between continuous slots to be equal to or less than a prescribed range.

Preferably, the reference signal configuration continuously deploys a pair of reference signals having a length of a half-OFDM symbol and the V2V device can perform frequency compensation according to a phase offset of the continuously deployed pair of reference signals.

Preferably, the reference signal configuration is applied to partial subframes among a plurality of subframes existing in a prescribed time section and frequency offset compensation according to the partial subframes can be identically performed on the remaining subframes except the partial subframes among a plurality of the subframes existing in the prescribed time section.

To further achieve these and other advantages and in accordance with the purpose of the present invention, according to a different embodiment, a method of configuring a reference signal, which is configured by a V2V device to perform V2V (vehicle-to-vehicle) communication in a wireless communication system, includes the steps of setting a half-OFDM symbol of a first OFDM symbol index for AGC (automatic gain control) among OFDM (orthogonal frequency division multiplexing) symbols constructing a short-TTI (transmission time interval), setting a half-OFDM symbol of a last OFDM symbol index for TA (timing advance) among the OFDM (orthogonal frequency division multiplexing) symbols constructing the short-TTI (transmission time interval), and setting a reference signal to the remaining half-OFDM symbol of the first OFDM symbol index and the remaining half-OFDM symbol of the last OFDM symbol index.

Preferably, the reference signal configuration is applied to partial subframes among a plurality of subframes existing in a prescribed time section and frequency offset compensation according to the partial subframes can be identically performed on the remaining subframes except the partial subframes among a plurality of the subframes existing in the prescribed time section.

To further achieve these and other advantages and in accordance with the purpose of the present invention, according to a further different embodiment, a V2V device receiving a reference signal to perform V2V (vehicle-to-vehicle) communication in a wireless communication system includes an RF (radio frequency) unit and a processor, the processor configured to perform synchronization with a first synchronization source having a frequency for performing DSRC (dedicated short range communication) as a center frequency, the processor configured to receive a reference signal on an OFDM (orthogonal frequency division multiplexing) symbol, which is configured according to a reference signal configuration, from the first synchronization source. In this case, the reference signal configuration can be defined for frequency compensation according to a hop sync of the center frequency.

To further achieve these and other advantages and in accordance with the purpose of the present invention, according to a further different embodiment, a V2V device configuring a reference signal to perform V2V (vehicle-to-vehicle) communication in a wireless communication system includes an RF (radio frequency) unit and a processor, the processor configured to set a half-OFDM symbol of a first OFDM symbol index for AGC (automatic gain control) among OFDM (orthogonal frequency division multiplexing) symbols constructing a short-TTI (transmission time interval), the processor configured to set a half-OFDM symbol of a last OFDM symbol index for TA (timing advance) among the OFDM (orthogonal frequency division multiplexing) symbols constructing the short-TTI (transmission time interval), the processor configured to set a reference signal to the remaining half-OFDM symbol of the first OFDM symbol index and the remaining half-OFDM symbol of the last OFDM symbol index.

Advantageous Effects

According to embodiments of the present invention, it is able to efficiently configure a reference signal for V2V communication in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram for explaining D2D (UE-to-UE communication) communication;

BEST MODE

Mode for Invention

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figures 1, 10:
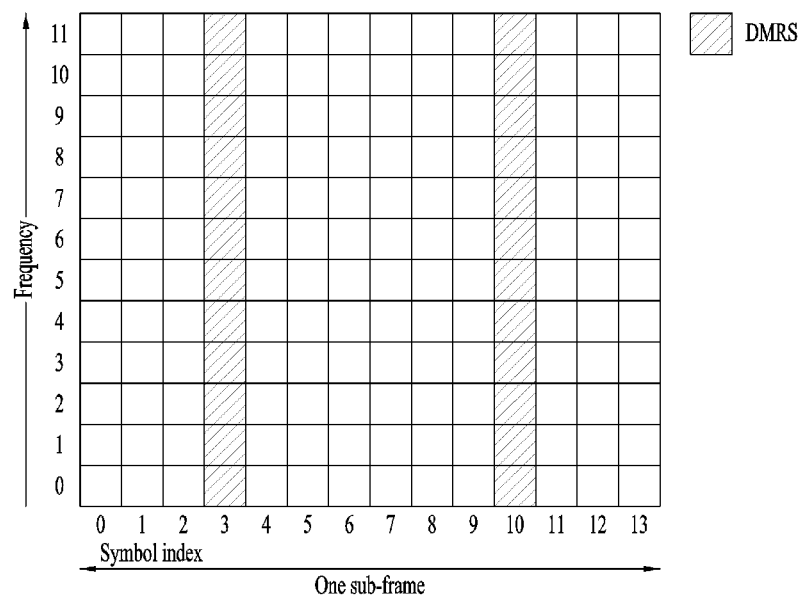
FIGS. 10 to 20 are diagrams for explaining a reference signal configuration according to one embodiment of the present invention.
Figures 2, 10:
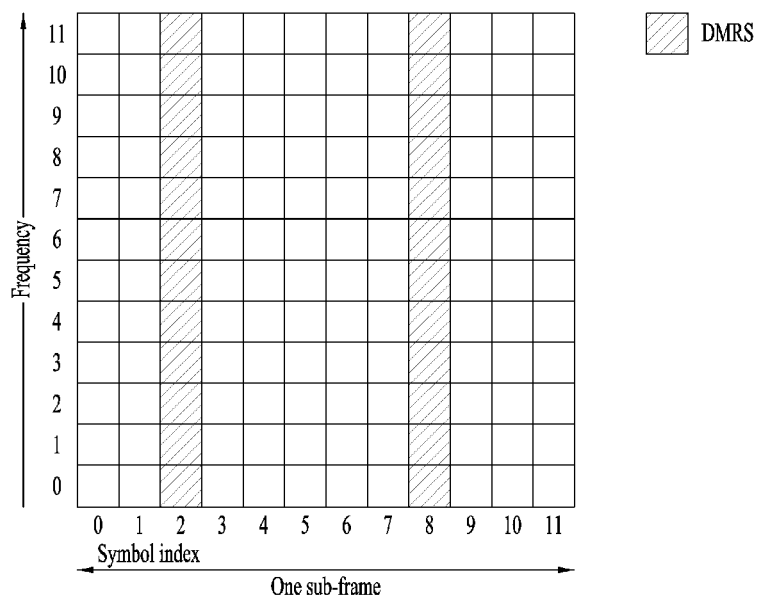
FIG. 2 is a diagram illustrating structures of a control plane and a user plane of a radio interface protocol between a user equipment and E-UTRAN based on the 3GPP radio access network standard.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 1:
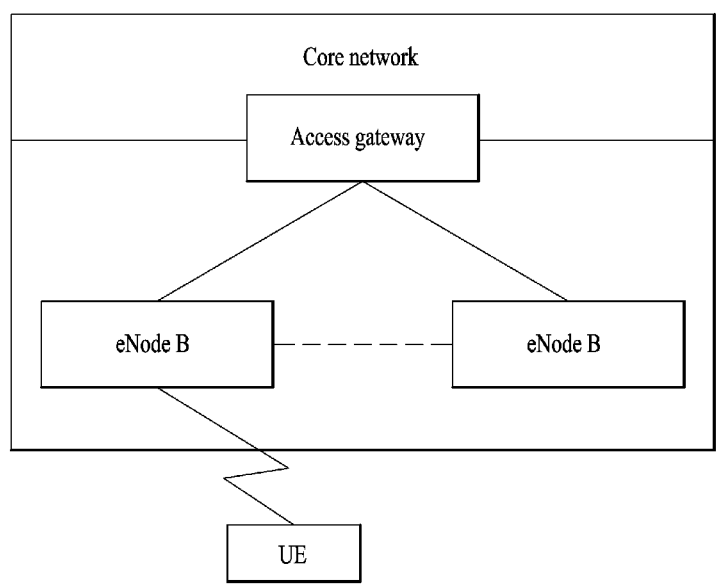
FIG. 1 is a schematic diagram of E-UMTS network structure as one example of a wireless communication system.
Figure 3:
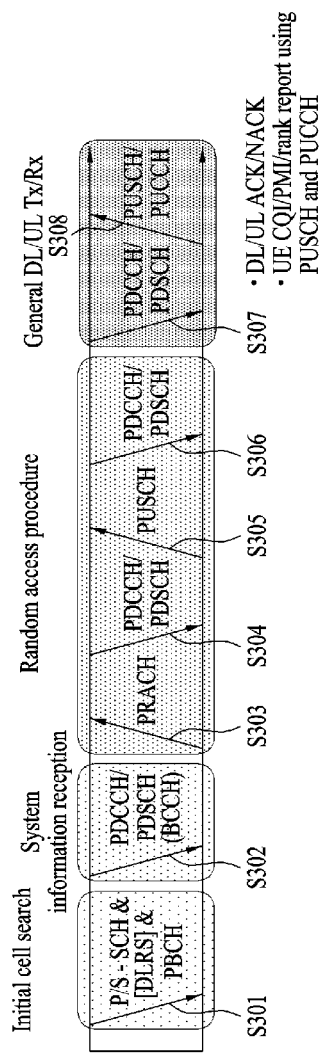
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
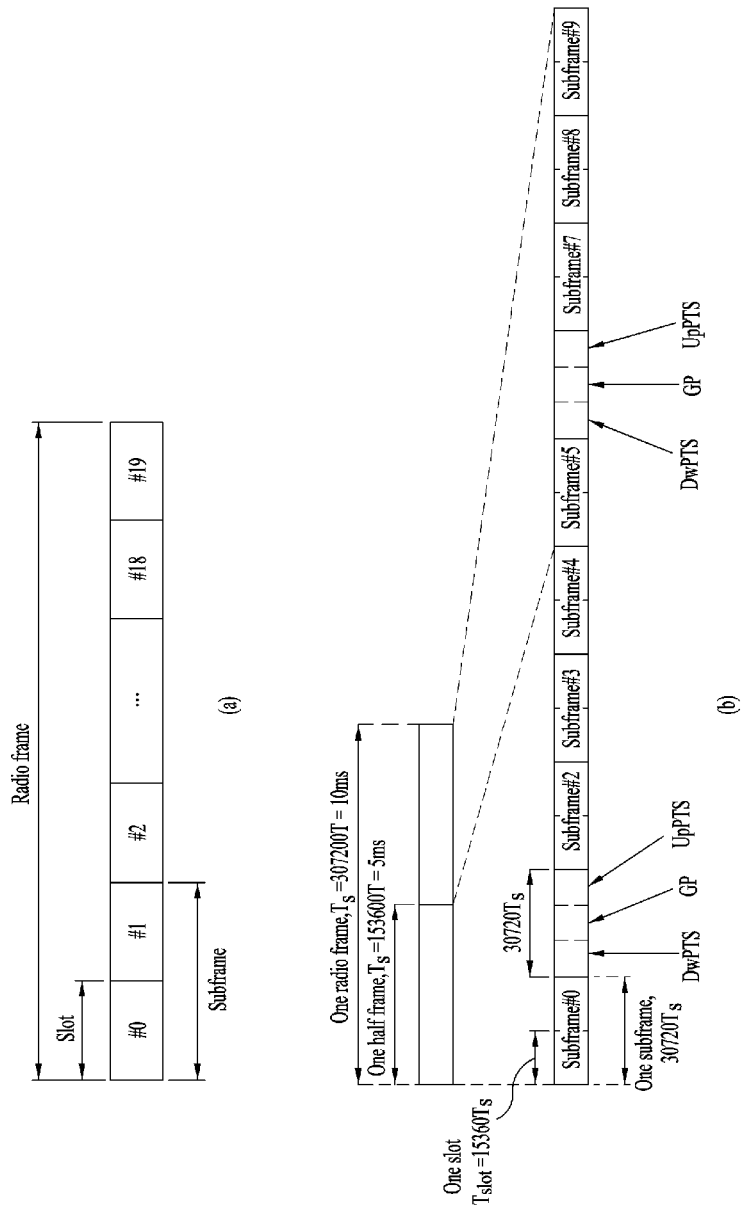
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
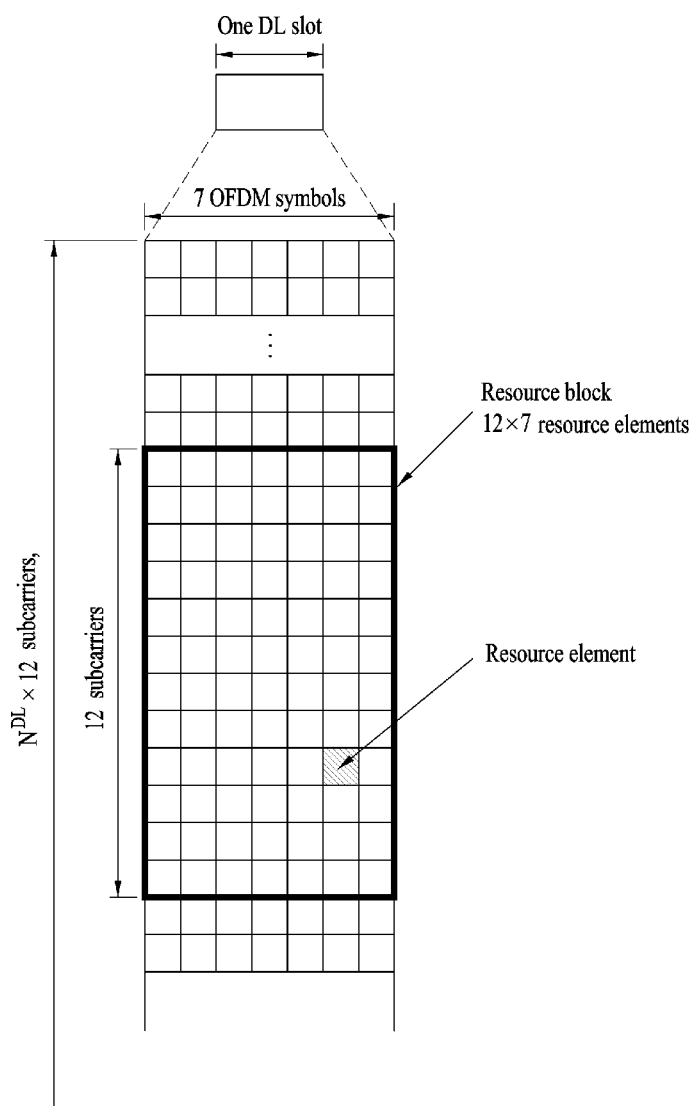
FIG. 5 is a diagram for an example of a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
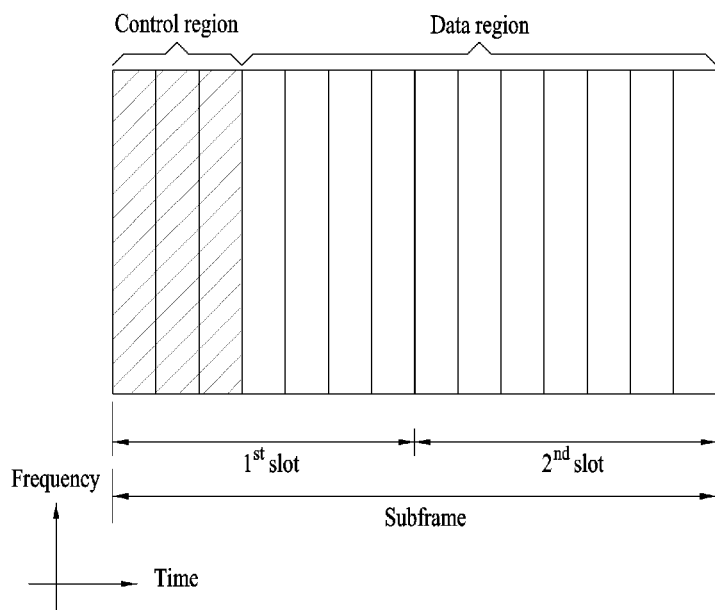
FIG. 6 is a diagram illustrating a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
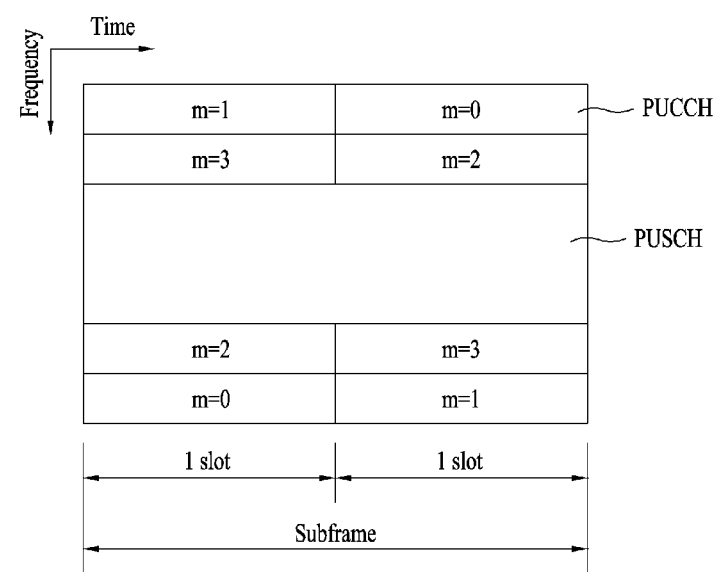
FIG. 7 is a diagram illustrating a structure of an uplink subframe used in an LTE system.

FIG. 7 is a diagram illustrating a structure of an uplink subframe used in an LTE system.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following description, a D2D (UE-to-UE communication) communication is explained.

A D2D communication scheme is mainly divided into a scheme of receiving help from a network/coordination station (e.g., a base station) and a scheme not receiving help from the network/coordination station.

Referring to FIG. 8, FIG. 8(a) shows a scheme that the network/coordination station involves in transmitting and receiving a control signal (e.g., a grant message), HARQ, channel state information, and the like and data is transmitted and received only between UEs performing D2D communication. FIG. 8(b) shows a scheme that the network provides minimum information (e.g., D2D connection information capable of being used in a corresponding cell, etc.) to UEs and the UEs performing D2D communication form a link and perform data transmission and reception.

Figure 9:
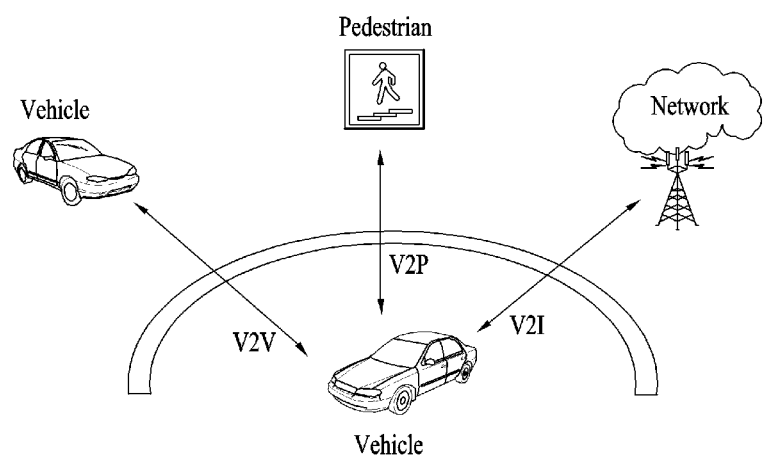
FIG. 9 is a diagram for explaining a V2V scenario.

FIG. 9 is a diagram illustrating V2X (vehicle to everything) communication environment.

If a car accident occurs, damage of human life and damage of property occur. Hence, when a vehicle operates, a technology capable of securing not only the safety of a person on the vehicle but also the safety of a pedestrian is increasingly required. As a result, a hardware and software based technology specialized to a vehicle is now incorporated into a vehicle.

An LTE-based V2X (vehicle-to-everything) communication technology started from 3GPP also reflects the tendency that an IT (information technology) is incorporated into a vehicle. A connectivity function is mainly applied to a certain type of vehicle and ongoing effort to support V2V (vehicle-to-vehicle) communication, V2I (vehicle-to-infrastructure) communication, V2P (vehicle-to-pedestrian) communication, and V2N (vehicle-to-network) is in progress via the evolvement of the connectivity function.

According to the V2X communication, a vehicle consistently broadcasts information on a location, a speed, a direction, and the like of the vehicle. Having received the broadcasted information, an adjacent vehicle recognizes movement of vehicles near the adjacent vehicle and utilizes the movements to prevent an accident.

Similar to a case that a person possesses a terminal having a shape of a smartphone or a smart watch, a terminal (or, a UE (user equipment)) of a specific shape is installed in each vehicle. In this case, the UE installed in a vehicle corresponds to a device receiving an actual communication service from a network. For example, the UE installed in the vehicle can receive a communication service in a manner of accessing an eNB in E-UTRAN.

Yet, in order to implement V2X communication in a vehicle, it is necessary to consider various items. This is because an astronomical amount of money is required to install a traffic safety infrastructure such as a V2X eNB, and the like. In particular, in order to support the V2X communication to all of the roads on which a vehicle is movable, it is necessary to install hundreds of thousands of V2X eNBs. Moreover, since each network node basically uses a wired network to stably perform communication with a server and accesses the internet or a central control server using the wired network, installation/maintenance cost for the wired network is also high.

Based on the aforementioned contents, the present invention proposes a method of designing a DMRS to overcome a frequency offset error and use a short-TTI in a V2V (vehicle to vehicle) scenario. In particular, although it is able to design V2V based on D2D communication of LTE, DMRS design of the present invention is explained by additionally considering a frequency error due to a moving speed of a vehicle.

In the following, the present invention is explained centering on the V2V. Yet, the present invention can also be applied to a different scenario such as D2D and the like.

In V2V communication, it may be able to use a legacy LTE PUSCH structure-based subframe structure. FIG. 10a shows a DMRS structure in a normal CP of current LTE in a subframe and FIG. 10b shows a DMRS structure in an extended CP.

According to a V2V scenario currently discussed in LTE, 5.9 GHz, which is used for DSRC (dedicated short range communication), can also be considered as a center frequency target. Currently, a requirement for an initial frequency offset corresponds to 10 ppm (pulses per minute) and a residual frequency offset requirement corresponds to +/−0.1 ppm.

Assume that two vehicles hold sync via a signal provided by a common eNB, a common vehicle, or a common source. In this case, a frequency offset difference between the two vehicles may correspond to +/−0.2 ppm. When a vehicle holds sync via a different vehicle, it might say that the vehicles have 2 hop syncs. If two vehicles hold 2 hop syncs from the same vehicle, a frequency offset difference between the two vehicles may correspond to +/−0.4 ppm. If two vehicles hold 3 hop syncs from the same vehicle, a frequency offset difference between the two vehicles may correspond to +/−0.6 ppm.

If it is assumed that a DMRS is designed like FIG. 10a and a frequency offset is compensated via DMRSs of 2 columns, it is necessary to measure an amount of phase offset due to a frequency offset increased during 0.5 ms. This is because a frequency offset is estimated based on the amount of the phase offset.

Table 3 in the following shows an amount of phase offset increased during 0.5 ms according to a center frequency or a plurality of hop syncs.

TABLE 3

| Carrier | Phase increment over 0.5 ms (DMRS interval) | | |
|---|---|---|---|
| Frequency | 0.1 ppm | 0.4 ppm | 0.6 ppm |
| 700 MHz | 70 Hz => 0.22 rad | 280 Hz => 0.88 rad | 420 Hz => 1.32 rad |
| 2 GHz | 200 Hz => 0.63 rad | 800 Hz => 2.51 rad | 1200 Hz => 3.77 rad > pi |
| 5.9 GHz | 590 Hz => 1.85 rad | | |

As shown in Table 3, although a frequency offset as much as +/−0.6 ppm exists at the center frequency of 700 MHz, since a phase offset value does not exceed a pi ($\pi$) value, there is no problem in compensating for the frequency offset value using a current DMRS structure. Yet, when the center frequency becomes 2 GHz, if the frequency offset corresponds to +/−0.6 ppm, the phase offset value exceeds the pi value. Hence, a problem may occur in compensating for the frequency offset value using the current DMRS structure. Moreover, if the center frequency corresponds to 5.9 GHz, although a frequency offset value corresponds to +/−0.2 ppm, the phase offset value exceeds the pi value. Hence, a problem may occur in compensating for the frequency offset value using the current DMRS structure.

In fact, the frequency offset of +/−0.2 ppm may correspond to a minimum frequency offset value in V2V. In order to perform communication between two vehicles synchronized based on a single vehicle or an eNB, it is necessary to assume that a frequency offset of +/−0.2 ppm already exists. In this case, if the vehicles operate on a center frequency of 5.9 GHz, it is difficult to compensate for the frequency offset using a current DMRS structure.

Table 4 shows a simulation result showing an amount of phase offset when a frequency offset corresponds to x ppm and a DMRS of y symbol interval is used.

Figures 1, 13:
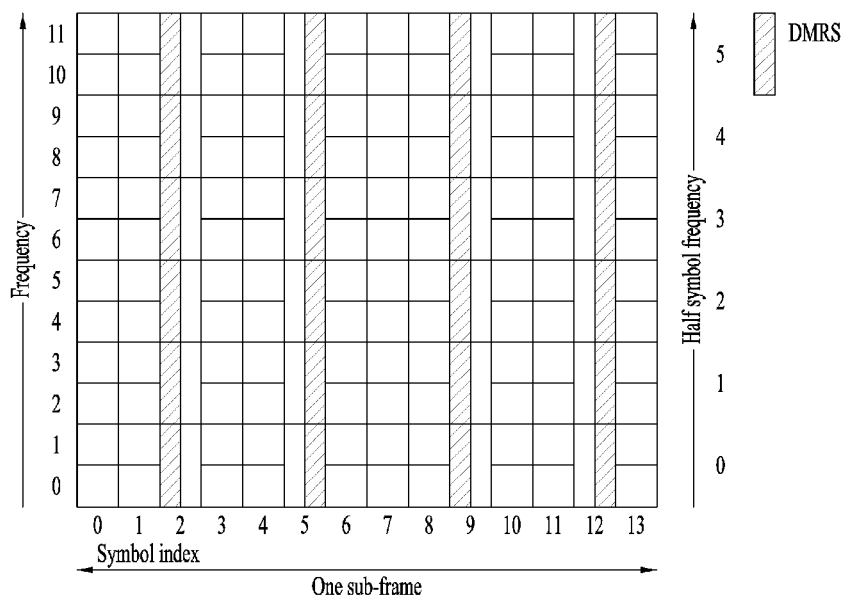
Figures 2, 13:
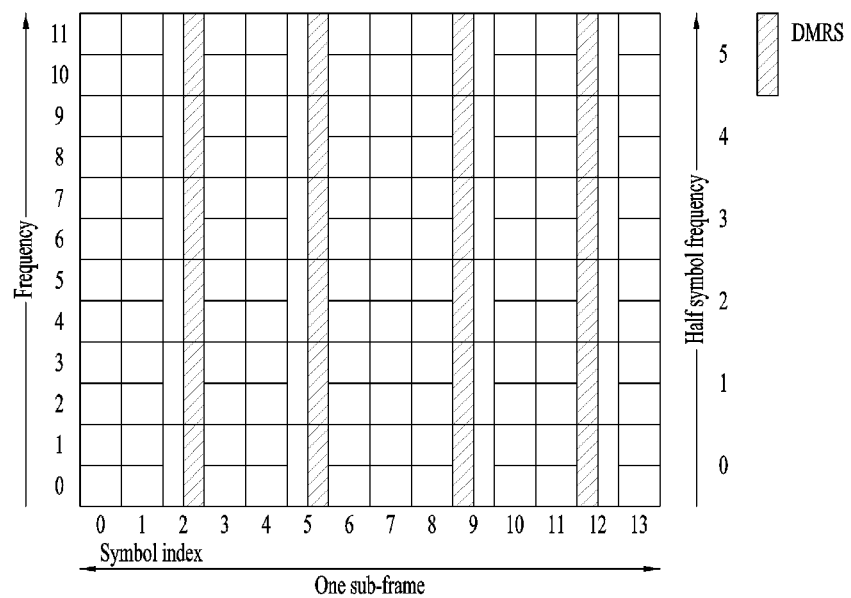
Figures 3, 13:
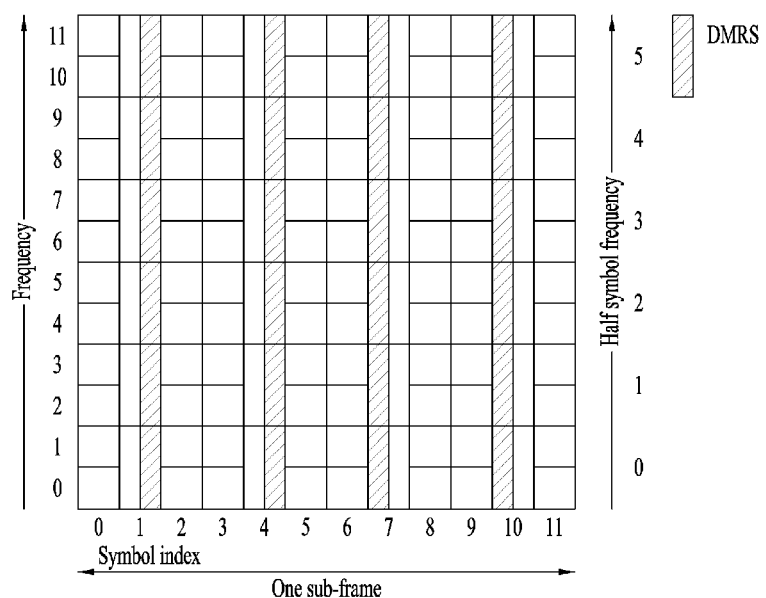

As shown in Table 4, if a frequency offset value is equal to +/−0.2 ppm, it is necessary to have a DMRS of 5-symbol interval. If a frequency offset value corresponds to +/−0.4 ppm, it is necessary to have a DMRS of 2-symbol interval. If a frequency offset value is equal to or greater than +/−0.6 ppm, it is necessary to have a DMRS of 1-symbol interval to correctly compensate for the frequency offset.

reduce the maximum DMRS interval in consideration of a frequency offset, it may design a DMRS like FIG. 13a.

TABLE 4

|  | 0.1 ppm 0.1 | 0.2 ppm 0.2 | 0.3 ppm 0.3 | 0.4 ppm 0.4 | 0.5 ppm 0.5 | 0.6 ppm 0.6 | 0.7 ppm 0.7 | 0.8 ppm 0.8 | 0.9 ppm 0.9 | 1.0 ppm 1 |
|---|---|---|---|---|---|---|---|---|---|---|
| 1 symbol | 0.0714286 | 0.264791 | 0.529583 | 0.794374 | 1.059165 | 1.323957 | 1.588748 | 1.853539 | 2.118331 | 2.383122 | 2.647913 |
| 2 symbol | 0.1428571 | 0.529583 | 1.059165 | 1.588748 | 2.118331 | 2.647913 | 3.1775 | 3.70708 | 4.23666 | 4.76624 | 5.29583 |
| 3 symbol | 0.2142857 | 0.794374 | 1.588748 | 2.383122 | 3.1775 | 3.97187 | 4.76624 | 5.56062 | 6.35499 | 7.14937 | 7.94374 |
| 4 symbol | 0.2857143 | 1.059165 | 2.118331 | 3.1775 | 4.23666 | 5.29583 | 6.35499 | 7.41416 | 8.47332 | 9.53249 | 10.5917 |
| 5 symbol | 0.3571429 | 1.323957 | 2.647913 | 3.97187 | 5.29583 | 6.61978 | 7.94374 | 9.2677 | 10.5917 | 11.9156 | 13.2396 |
| 6 symbol | 0.4285714 | 1.588748 | 3.1775 | 4.76624 | 6.35499 | 7.94374 | 9.53249 | 11.1212 | 12.71 | 14.2987 | 15.8875 |
| 7 symbol | 0.5 | 1.853539 | 3.70708 | 5.56062 | 7.41416 | 9.2677 | 11.1212 | 12.9748 | 14.8283 | 16.6819 | 18.5354 |
| 8 symbol | 0.5714286 | 2.118331 | 4.23666 | 6.35499 | 8.47332 | 10.5917 | 12.71 | 14.8283 | 16.9466 | 19.065 | 21.1833 |
| 9 symbol | 0.6428571 | 2.383122 | 4.76624 | 7.14937 | 9.53249 | 11.9156 | 14.2987 | 16.6819 | 19.065 | 21.4481 | 23.8312 |
| 10 symbol | 0.7142857 | 2.647913 | 5.29583 | 7.94374 | 10.5917 | 13.2396 | 15.8875 | 18.5354 | 21.1833 | 23.8312 | 26.4791 |
| 11 symbol | 0.7857143 | 2.912705 | 5.82541 | 8.73811 | 11.6508 | 14.5635 | 17.4762 | 20.3889 | 23.3016 | 26.2143 | 29.127 |
| 12 symbol | 0.8571429 | 3.1775 | 6.35499 | 9.53249 | 12.71 | 15.8875 | 19.065 | 22.2425 | 25.42 | 28.5975 | 31.775 |
| 13 symbol | 0.9285714 | 3.44229 | 6.88457 | 10.3269 | 13.7691 | 17.2114 | 20.6537 | 24.096 | 27.5383 | 30.9806 | 34.4229 |
| 14 symbol | 1 | 3.70708 | 7.41416 | 11.1212 | 14.8283 | 18.5354 | 22.2425 | 25.9495 | 29.6566 | 33.3637 | 37.0708 |

The present invention proposes a method of designing a DMRS in detail to correctly compensate for a frequency offset in the abovementioned V2V scenario.

Embodiment 1

If it is assumed that DMRS overhead is maintained for a DMRS designed in an uplink resource of a legacy LTE system, it is able to increase the number of DMRS symbols for frequency offset and decrease a length of each DMRS symbol in a time axis.

Figures 1, 11:
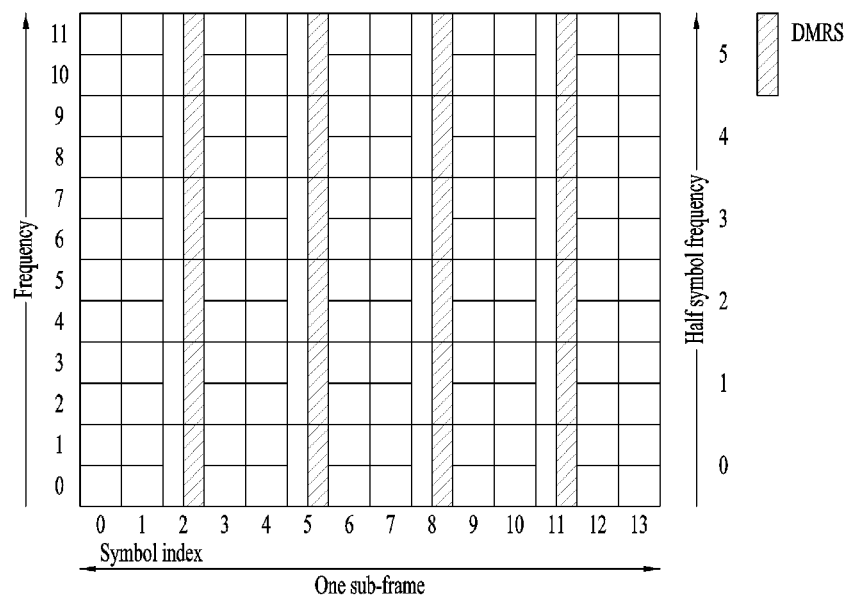
Figures 2, 11:
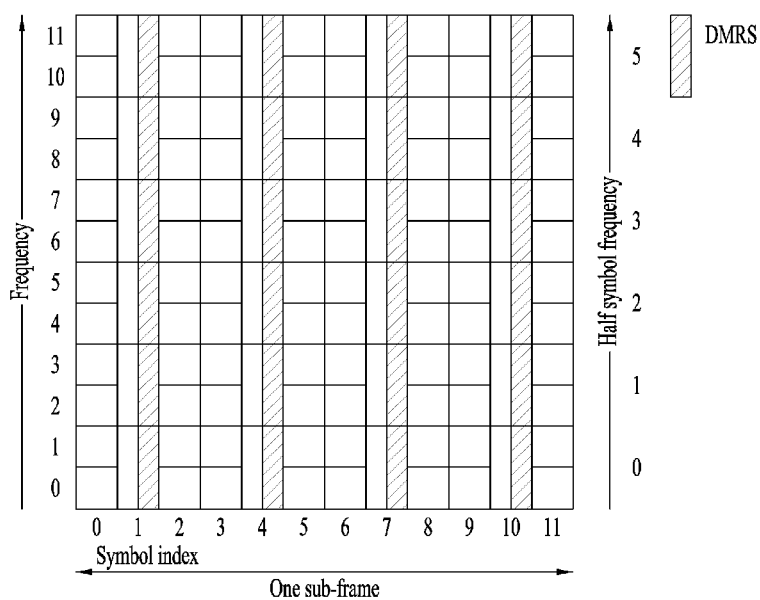

For example, assume that 4 DMRSs are inserted. As shown in FIG. 11a (in case of an extended CP, FIG. 11b), overhead similar to legacy LTE is maintained by reducing a time length of a DMRS symbol by half and a symbol position of a DMRS is deployed by the same interval of 3 symbols. In particular, it may be able to more easily compensate for a frequency offset via a more reduced DMRS interval compared to a DMRS of an interval of 7 symbols of legacy LTE. If DMRS are deployed with the same interval, it is expected that it is able to more easily estimate a channel compared to a case that a partial DMRS interval is maintained to be short and the remaining DMRS interval is maintained to be longer than the shortened interval.

In FIG. 11a, although a DMRS is positioned at a rear side of a previous symbol position (i.e., legacy LTE system) as much as a half symbol in a $2^{nd}$, a $5^{th}$, an $8^{th}$, and an $11^{th}$ symbol position (i.e., OFDM symbol index), the DMRS can be positioned at a front side of the previous symbol position (i.e., legacy LTE system) as well.

In FIG. 11b, although a DMRS is positioned at a rear side of a previous symbol position (i.e., legacy LTE system) as much as a half symbol in a $1^{st}$, a $4^{th}$, an $7^{th}$, and a $10^{th}$ symbol position, the DMRS can be positioned at a front side of the previous symbol position (i.e., legacy LTE system) as well.

The embodiment 1 is explained using a different example.

If a DMRS is designed like FIG. 11a, two slots included in a subframe do not maintain the same shape. When operations of a slot unit are considered, the DMRS design may play a role in increasing complexity of a vehicle receiving the DMRS.

Figure 12:
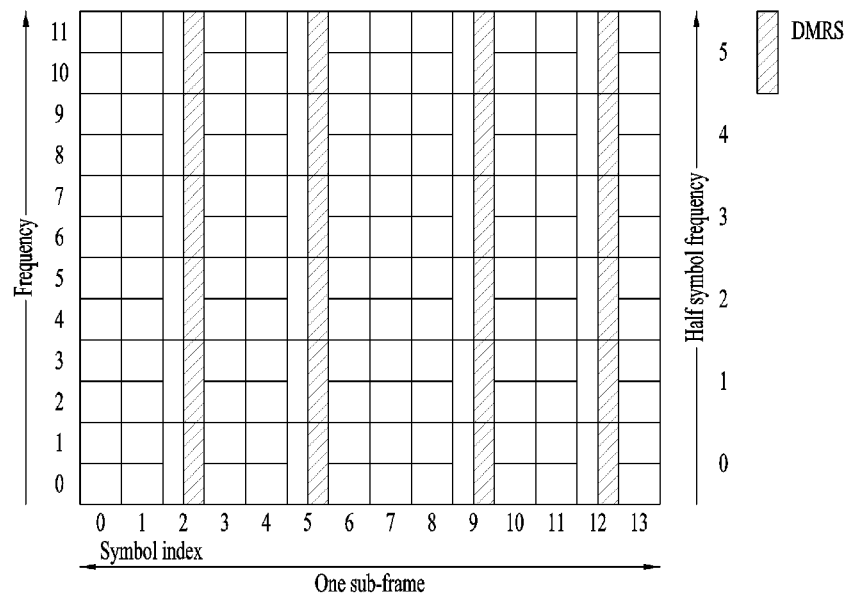

In order to prevent this, as shown in FIG. 12, it may design a DMRS using two slots of the same shape. If a DMRS shown in FIG. 12 is designed, a DMRS interval may become maximum 4 symbols. When a DMRS is designed while the same shape of slots is maintained, in order to reduce the maximum DMRS interval in consideration of a frequency offset, it may design a DMRS like FIG. 13a.

Referring to the DMRS shown in FIG. 13a, compared to the DMRS shown in FIG. 12, if the DMRS is positioned at the front side of a symbol in a $2^{nd}$ and a $9^{th}$ symbol position, a DMRS maximum interval between contiguous slots (e.g., $1^{st}$ slot and $2^{nd}$ slot) is reduced to 3.5 symbols. Or, it may also be able to design a DMRS like FIG. 13b. In case of using an extended CP, it may design a DMRS like FIG. 13c to reduce a minimum DMRS interval within a slot to 2.5 symbols compared to the DMRS shown in FIG. 11b.

Moreover, if a DMRS is designed according to the embodiment 1, a DMRS interval is generated more than 1 symbol. In this case, as shown in Table 4, it is able to compensate for a frequency offset of 0.3 ppm on 5.9 GHz center frequency. If +/−0.4 ppm frequency offset occurs between two vehicles, which have 2 hop syncs from a certain vehicle, it is necessary to allow maximum 1 hop sync when synchronization is performed. In other word, it is necessary to make a vehicle to be synchronized with a single independent sync source only. The independent sync source may correspond to a vehicle or an eNB.

In particular, if a V2V UE is synchronized with an independent sync source, the V2V UE can receive a reference signal based on a reference signal configuration proposed in the present invention.

Moreover, if a DMRS is designed according to the embodiment 1, since a length of the DMRS becomes a half of a length of an OFDM symbol, the DMRS may have a frequency length as much as twice compared to an original length in terms of frequency domain. And, since a length of a half symbol is used for a DMRS, a region corresponding to a length of the remaining half symbol can be used as a data region. If the DMRS designed according to the embodiment 1 is used, a vehicle receiving the DMRS can be configured to recognize that data adjacent to the DMRS is configured by a half symbol.

Embodiment 2

The aforementioned embodiment 1 explains a method of compensating for a frequency offset using more DMRSs by using a DMRS of a length of a half symbol while DMRSs are relatively evenly deployed.

The embodiment 2 described in the following explains a method of compensating for a frequency offset by designing an interval of a partial DMRS to be very short while DMRSs are unevenly deployed.

Figures 1, 14:
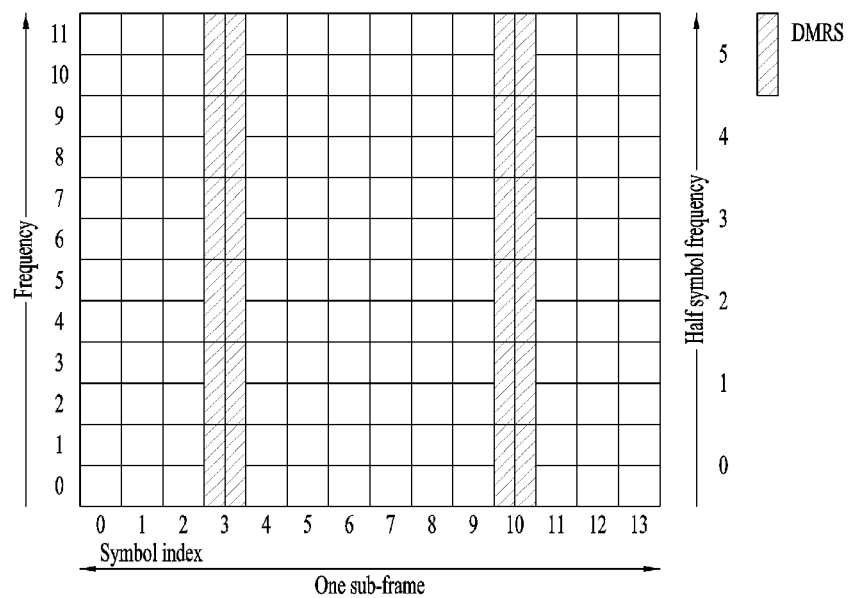
Figures 2, 14:
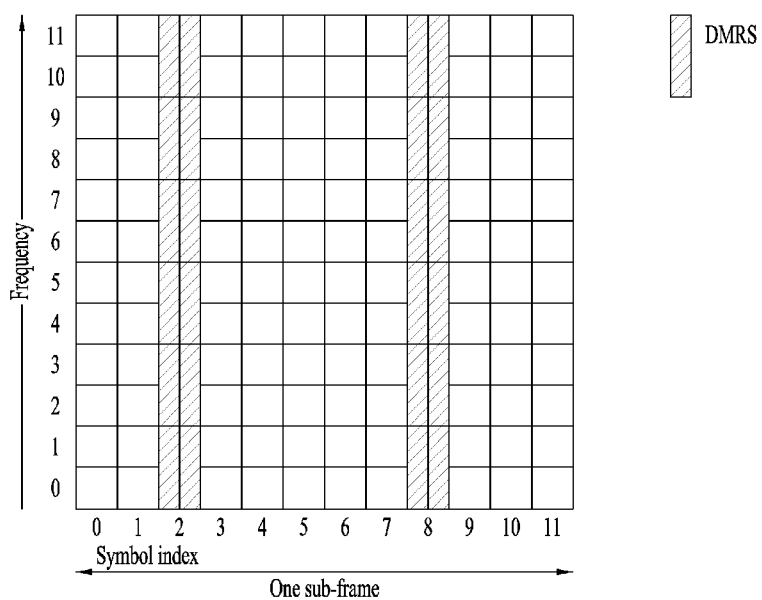

FIG. 14 illustrates a position at which a DMRS is transmitted in LTE. For example, referring to FIG. 14a, a $3^{rd}$ symbol and a $10^{th}$ symbol correspond to positions at which a DMRS is actually transmitted in an uplink resource of LTE. If a DMRS is designed by dividing each of the symbols into two half symbols, a receiving vehicle may use the two pairs of DMRSs each of which has a length of half symbol to compensate for a frequency offset. In case of using an extended CP, a DMRS can be designed like FIG. 14b.

Figures 1, 15:
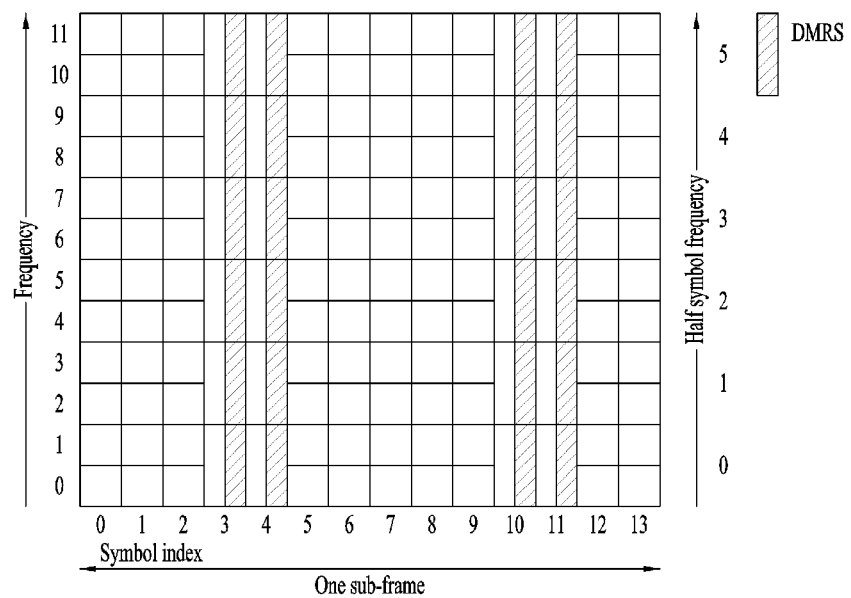
Figures 2, 15:
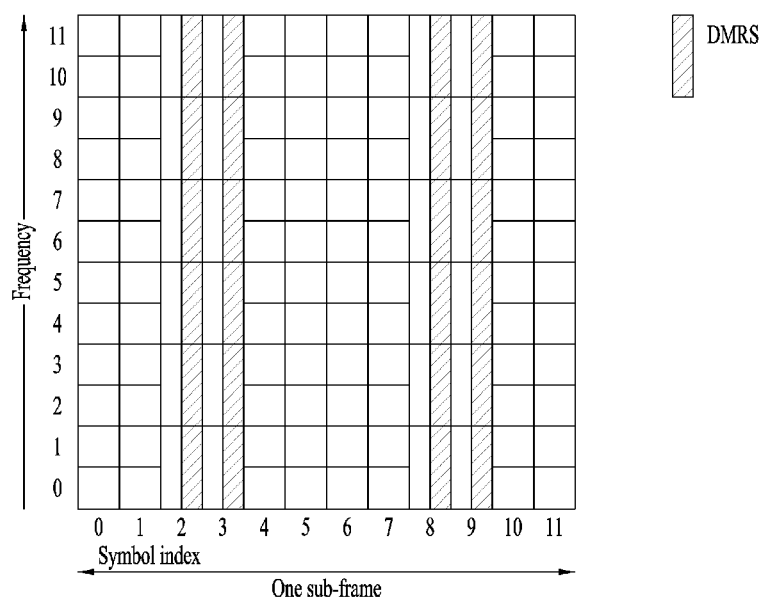

The DMRS design shown in FIGS. 14a and 14b can be easily used when a frequency offset is big. Yet, if a DMRS interval is too close, a phase offset by a frequency offset may not be evident. In this case, as shown in FIG. 15a, it may design a DMRS of 1 symbol interval. In case of using an extended CP, a DMRS can be designed like FIG. 15b.

For example, In FIG. 15a, although a DMRS is positioned at a rear side of a previous symbol position (i.e., legacy LTE system) as much as a half symbol in a $3^{rd}$, a $4^{th}$, a $10^{th}$, and an $11^{th}$ symbol position, the DMRS can be positioned at a front side of the previous symbol position (i.e., legacy LTE system) as well.

As a different example, in FIG. 15b, although a DMRS is positioned at a rear side of a previous symbol position (i.e., legacy LTE system) as much as a half symbol in a $2^{nd}$, a $3^{rd}$, an $8^{th}$, and a $9^{th}$ symbol position, the DMRS can be positioned at a front side of the previous symbol position (i.e., legacy LTE system) as well.

Moreover, if a DMRS is designed according to the embodiment 2, a DMRS interval is generated more than 0.5 symbol. In this case, when sync is performed, if many hops are undergone, it may have a problem in compensating for a frequency offset. In particular, since the number of hops and whether to allow sync vary according to a center frequency, it may set a limit on the number of hops for matching sync according to the center frequency.

Moreover, if a DMRS is designed according to the embodiment 2, since a length of the DMRS becomes a half of a length of an OFDM symbol, the DMRS may have a frequency length as much as twice compared to an original length in terms of frequency domain. And, since a length of a half symbol is used for a DMRS, a region corresponding to a length of the remaining half symbol can be used as a data region. If the DMRS designed according to the embodiment 2 is used, a vehicle receiving the DMRS can be configured to recognize that data adjacent to the DMRS is configured by a half symbol.

Embodiment 3

In the embodiment 1 and the embodiment 2, a design for maintaining DMRS overhead, which is used in legacy LTE, has been explained to design a DMRS. Yet, in some cases, it may design and use a DMRS in addition to two symbols of a DMRS of legacy LTE system.

Embodiment 4

When a DMRS is designed to compensate for a frequency offset, it may not design the DMRS in all subframes used in a data region.

In particular, it may design a DMRS for compensating for a frequency offset in partial subframes only in a prescribed section (e.g., a prescribed period) and a different DMRS design can be applied to the remaining subframes. In this case, a receiving vehicle compensates for a frequency offset in the subframes in which the DMRS for compensating for the frequency offset is designed and may be able to apply the compensated frequency offset to a different subframe. For example, when a message is transmitted on PSSCH (Physical Sidelink Synchronization CHannel), PSCCH (Physical Sidelink Control CHannel), and PSDCH (Physical Sidelink Data CHannel) currently used in D2D, the message can be transmitted over a plurality of subframes. In this case, although the DMRS for compensating for the frequency offset is used for partial subframes only and a different DMRS design is used for the remaining subframes, frequency offset compensation can be performed on the remaining subframes using the subframe in which the DMRS for compensating the frequency offset is used. Information on the subframe in which the DMRS for compensating for the frequency offset is used can be configured by an eNB via RRC signaling. Or, a transmitting vehicle can dynamically inform a receiving vehicle of the information.

In the following, a short-TTI capable of being used in V2V is explained.

Currently, general devices have a half-duplex problem in LTE system. In other word, when a vehicle transmits signals, the vehicle is unable to transmit the signals at the same time in general. When the vehicle receives signals, the vehicle is unable to receive the signals at the same time. When a message is transceived between vehicles in a random resource region, although a collision occurs between a transmitting vehicle and a receiving vehicle in using a resource, a device (e.g., a vehicle) is unable to recognize the collision. Hence, the half-duplex problem may consistently cause a collision problem. As an efficient method for solving the problem, it may use a short-TTI. If a TTI shorter than a current TTI (e.g., LTE system) is used in a time axis and the short TTI is hopped, it may be able to reduce the consistent collision problem.

When a short-TTI is designed, in general, it may be able to reduce the number of OFDM symbols constructing the TTI. This is a scheme of dividing a currently using TTI. When the scheme is applied, if a previously used format and a short TTI are transmitted and received at the same time, since a symbol boundary is matched between the format and the shot TTI, it may be able to more easily control interference.

In the following, when a short-TTI is designed, a method of designing a DMRS is explained in detail in the present invention.

Embodiment 5

If a TTI of current LTE system is divided into two TTIs for a short-TTI, the number of OFDM symbols of each of the TTIs may correspond to 7. In this case, it may consider AGC (automatic gain control) and TA (timing advance) in designing a DMRS.

Basically, a receiving end may use the very first symbol of TTI for the AGC. When the AGC is performed based on the very first symbol, since one symbol is fully used, an area to be used for a message can be reduced. In order to prevent this, a half of the first symbol is used for the AGC and the remaining half of the symbol can be used for a DMRS. According to current D2D, the last symbol is emptied out for TA. In this case, a half of the last symbol is emptied out for the TA and the remaining half of the last symbol can be used for a DMRS. If a DMRS is designed according to the abovementioned method, the DMRS may have a shape shown in FIG. 16a. In case of using an extended CP, a DMRS can be designed like FIG. 16b.

Figures 1, 16:
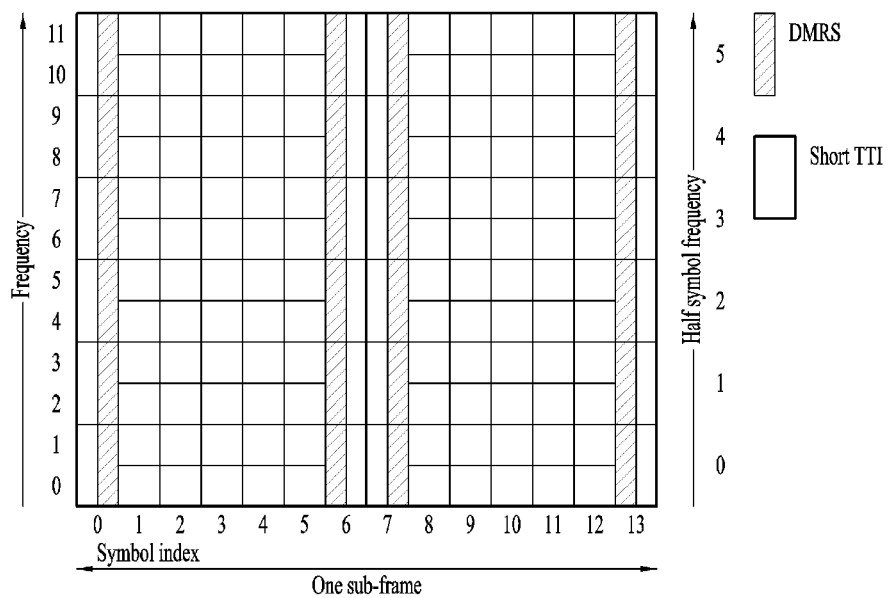
Figures 2, 16:
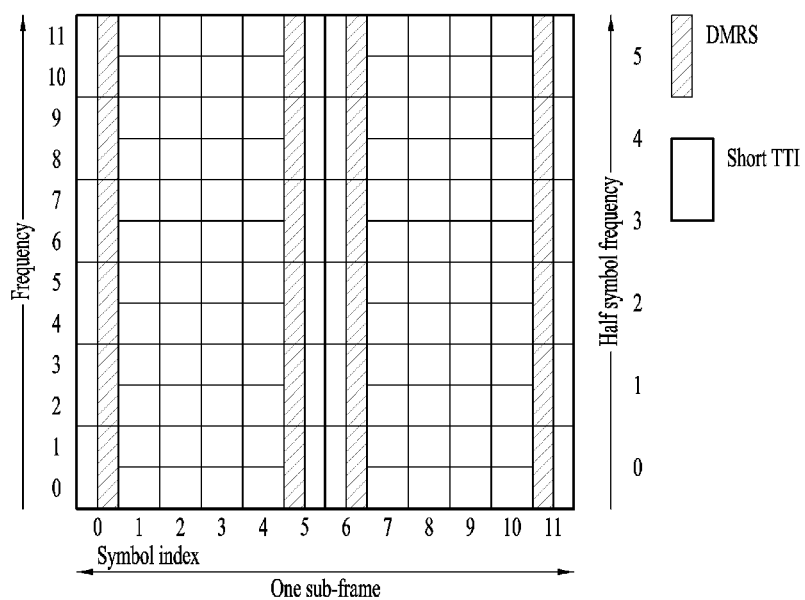

If a DMRS is designed like FIG. 16a, since a DMRS interval corresponds to 5.5 symbols, it is not easy to compensate for a frequency offset. In order to prevent this, it may additionally transmit a DMRS to a $3^{rd}$ and a $10^{th}$ symbol position. Or, it may additionally transmit a DMRS of two half symbols to the $3^{rd}$ and the $10^{th}$ symbol position.

If a DMRS is designed like FIG. 16b, since a DMRS interval corresponds to 4.5 symbols, it is not easy to compensate for a frequency offset. In order to prevent this, it may additionally transmit a DMRS to a $2^{nd}$ and an $8^{th}$ symbol position. Or, it may additionally transmit a DMRS of two half symbols to the $2^{nd}$ and the $8^{th}$ symbol position. Or, in FIG. 16b, it may additionally transmit a DMRS to a $3^{rd}$ and a $9^{th}$ symbol position. Or, it may additionally transmit a DMRS of two half symbols to the $3^{rd}$ and the $9^{th}$ symbol position.

Embodiment 6

If a TTI of current LTE system is divided into four TTIs for a short-TTI, the number of OFDM symbols of each of the TTIs may correspond to 3.5. In this case, it may consider AGC (automatic gain control) and TA (timing advance) in designing a DMRS. Basically, a receiving end may use the very first symbol of TTI for the AGC.

Figures 1, 17:
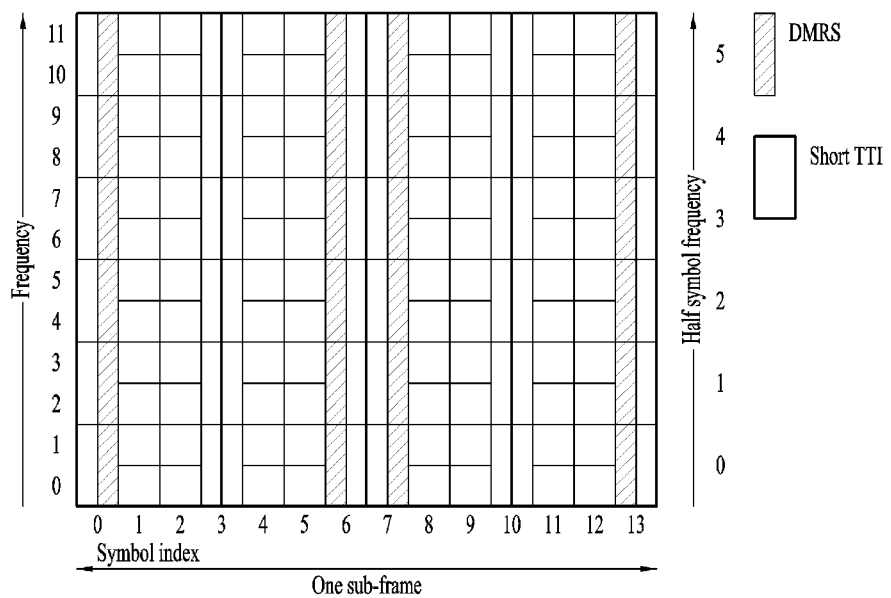
Figures 2, 17:
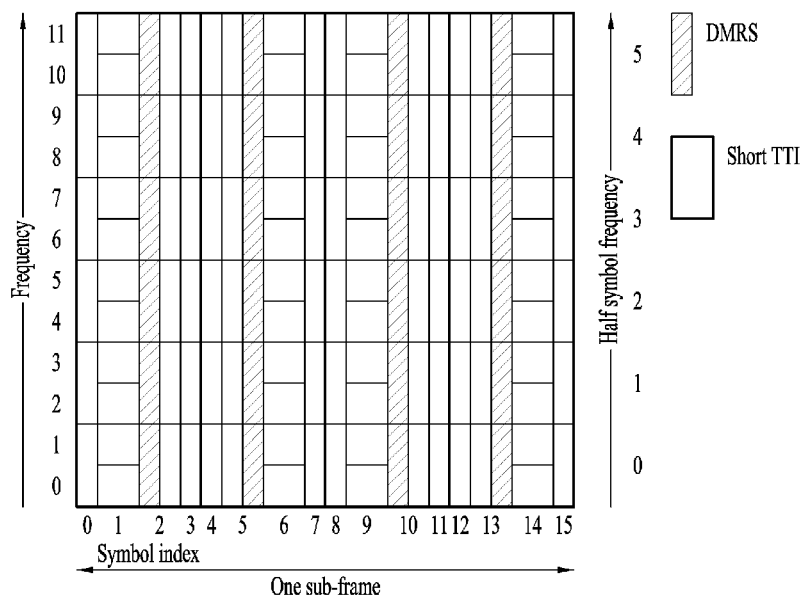
Figures 3, 17:
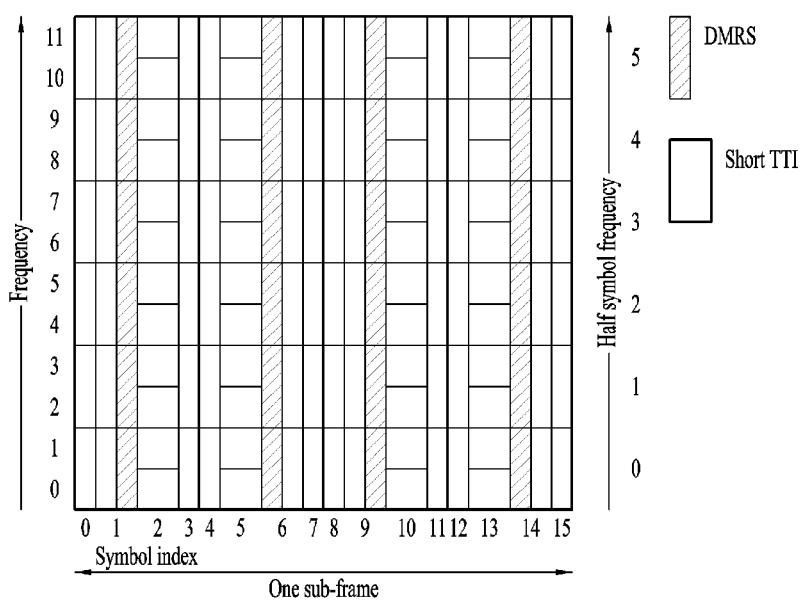

For example, a DMRS can be designed like FIG. 17a. Referring to FIG. 17a, basically, $3^{rd}$ symbol and a $10^{th}$ symbol are used for AGC and TA. A first half of the $3^{rd}$ symbol is emptied out for TA of a first short TTI and a second half of the $3^{rd}$ symbol is used for AGC of a second short TTI. A first half of the $10^{th}$ symbol is emptied out for TA of a third short TTI and a second half of the $10^{th}$ symbol is used for AGC of a fourth short TTI.

In FIG. 17a, $0^{th}$ and $7^{th}$ OFDM symbols use a half of an OFDM symbol length for AGC of the first and the third short TTI and design a DMRS using the remaining half of the OFDM symbol length.

In FIG. 17a, $6^{th}$ and $13^{th}$ OFDM symbols empty out a half of an OFDM symbol length for TA of the second and the fourth short TTI and design a DMRS using the remaining half of the OFDM symbol length.

In case of using an extended CP, if a TTI of current LTE system is divided into four TTIs for a short-TTI, the number of OFDM symbols of each of the TTIs can be designed by 3. In this case, it may consider AGC (automatic gain control) and TA (timing advance) in designing a DMRS. Basically, a receiving end may use the very first symbol of TTI for the AGC. For example, a DMRS can be designed like FIG. 17b or FIG. 17c.

In FIG. 17b or FIG. 17c, $0^{th}$, $3^{rd}$, $4^{th}$, $7^{th}$, $8^{th}$, $11^{th}$, $12^{th}$, and $15^{th}$ symbols correspond to a half symbol and $2^{nd}$, $5^{th}$, $10^{th}$, and $13^{th}$ symbols correspond to two half symbols divided from a symbol. In FIG. 17b, $0^{th}$, $4^{th}$, $8^{th}$, and $12^{th}$ symbols use a half symbol for AGC of a first, a second, a third, and a fourth short TTI. And, $3^{rd}$, $7^{th}$, $11^{th}$, and $15^{th}$ symbols empty out a half symbol for TA of a first, a second, a third, and a fourth short TTI.

Embodiment 7

In the embodiments 5 and 6, one embodiment of the present invention has been explained in consideration of a short TTI. Embodiment 7 described in the following shows that a subframe can be newly designed in consideration of AGC and TA.

First of all, the very first symbol and the very last symbol in TTI can be configured to have a length of a half symbol used in a current LTE TTI and a symbol having a length identical to a symbol length of the current LTE TTI is deployed at the center of the TTI. Then, a half of the very first symbol is used for AGC and a half of the very last symbol is emptied out for TA.

Figures 1, 18:
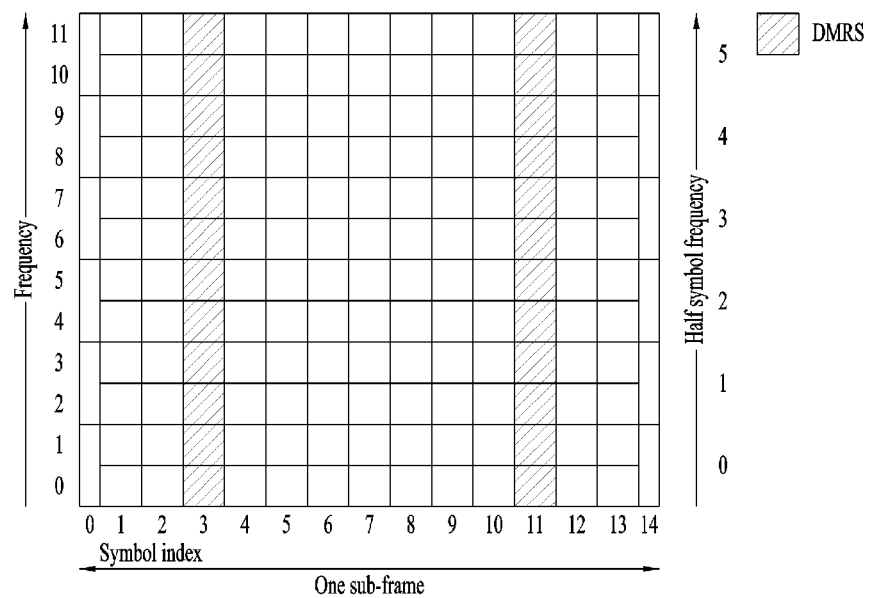
Figures 2, 18:
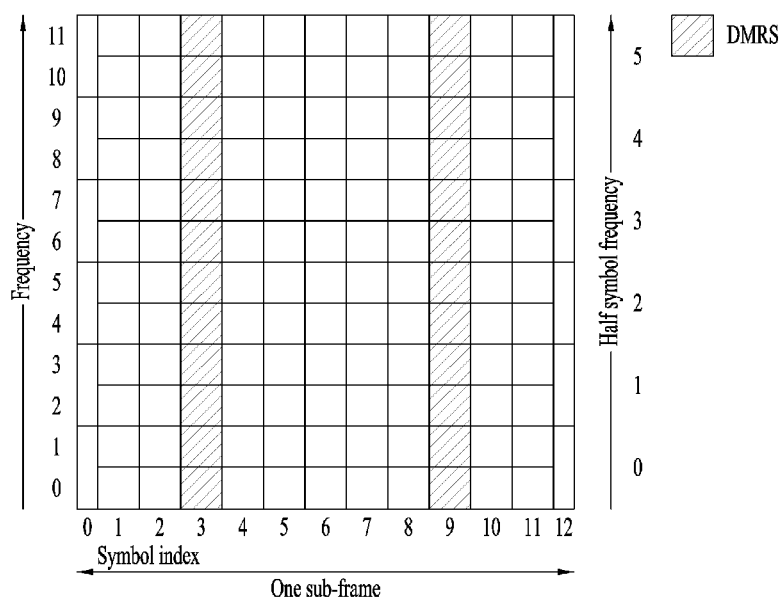

For example, a subframe is designed like FIG. 18a and a DMRS can be deployed to a $3^{rd}$ symbol and an $11^{th}$ symbol. Or, a DMRS can be deployed to a $4^{th}$ symbol and a $10^{th}$ symbol. In case of considering the aforementioned frequency offset, as shown in FIG. 19a, it may additionally deploy a DMRS to a $7^{th}$ symbol.

Figures 1, 19:
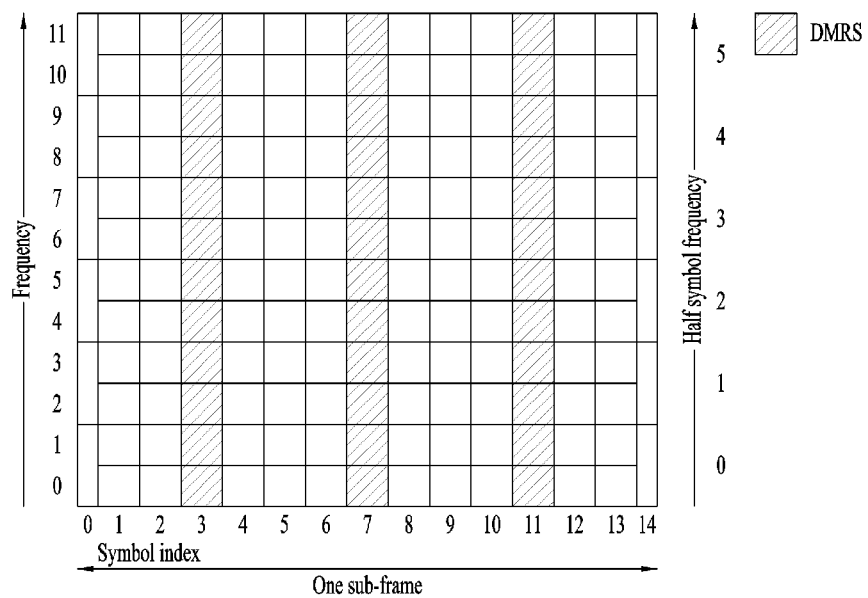
Figures 2, 19:
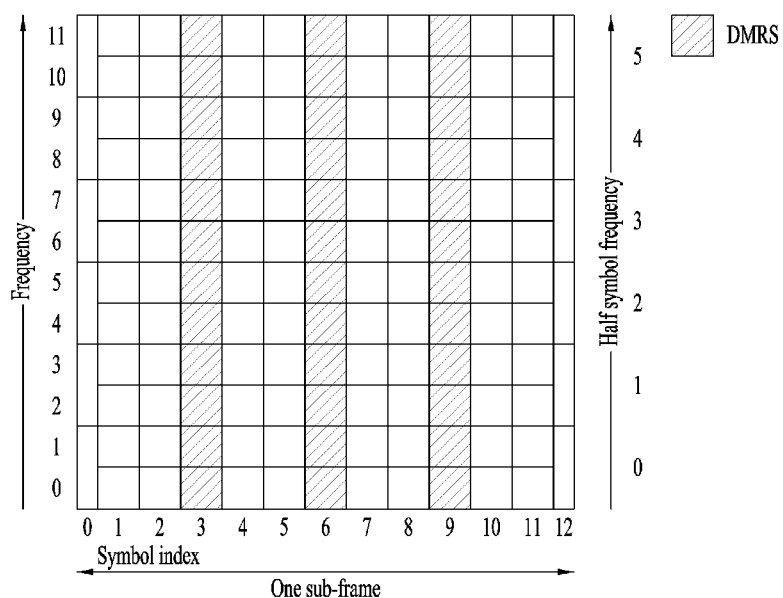

In FIGS. 18a and 19a, when a subframe basically includes 15 symbols, if the subframe is divided into two slots, the subframe can be divided into two slots including 8 symbols and 7 symbols, respectively. Or, a very first half symbol and 6 symbols appearing immediately after the half symbol can be defined as one slot and the remaining 7 symbols except a very last half symbol can be defined as one slot. In this case, the very last half symbol can be defined as guard time for TA.

Figures 1, 20:
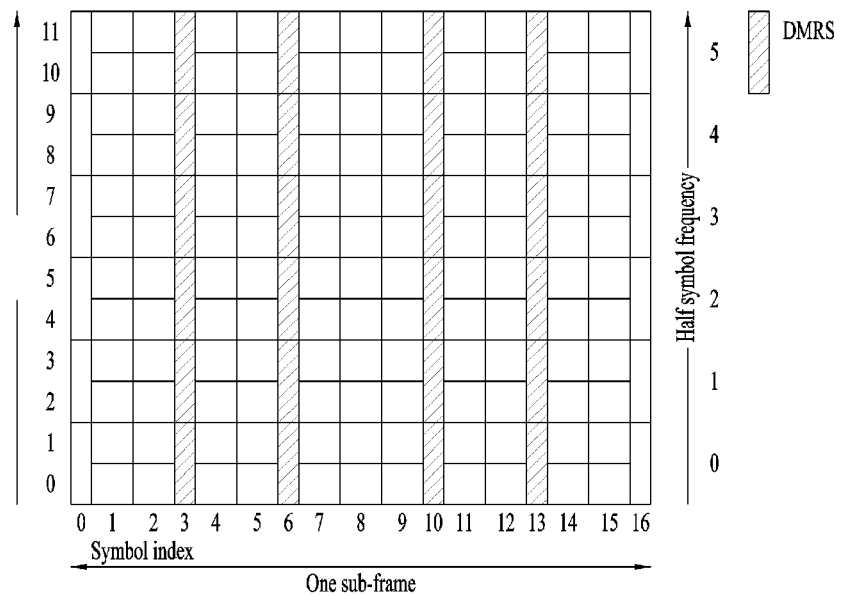
Figures 2, 20:
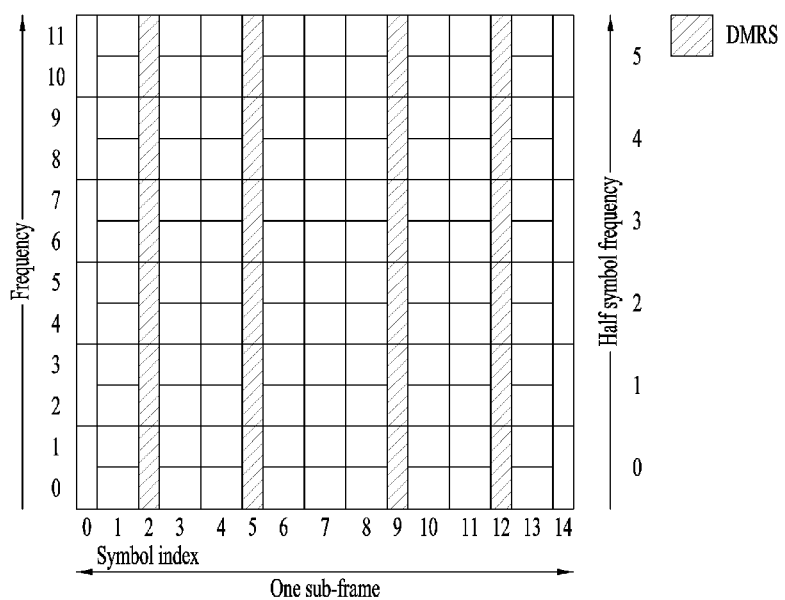

Or, a DMRS for a frequency offset shown in FIGS. 12, 13a, and FIG. 13b can also be designed like FIG. 20a in consideration of AGC and TA. By doing so, a region for transmitting data is designed by a length of one symbol without a half symbol.

In FIG. 20a, when a subframe basically includes 17 symbols, if the subframe is divided into two slots, the subframe can be divided into two slots including 9 symbols and 8 symbols, respectively. Or, a very first half symbol and 7 symbols appearing immediately after the half symbol can be defined as one slot and the remaining 8 symbols except a very last half symbol can be defined as one slot. In this case, the very last half symbol can be defined as guard time for TA.

In case of using an extended CP, a subframe can be designed like FIG. 18b and a DMRS can be deployed to a $3^{rd}$ symbol and a $9^{th}$ symbol. Or, a DMRS can be deployed to a $4^{th}$ symbol and an $8^{th}$ symbol. In case of considering the aforementioned frequency offset, as shown in FIG. 19b, it may additionally deploy a DMRS to a $6^{th}$ symbol.

In FIGS. 18b and 19b, when a subframe basically includes 13 symbols, if the subframe is divided into two slots, the subframe can be divided into two slots including 7 symbols and 6 symbols, respectively. Or, a very first half symbol and 5 symbols appearing immediately after the half symbol can be defined as one slot and the remaining 6 symbols except a very last half symbol can be defined as one slot. In this case, the very last half symbol can be defined as guard time for TA.

Or, a DMRS for a frequency offset shown in FIG. 13c can also be designed like FIG. 19b in consideration of AGC and TA. By doing so, a region for transmitting data is designed by a length of one symbol without a half symbol.

In FIG. 20b, when a subframe basically includes 15 symbols, if the subframe is divided into two slots, the subframe can be divided into two slots including 8 symbols and 7 symbols, respectively. Or, a very first half symbol and 6 symbols appearing immediately after the half symbol can be defined as one slot and the remaining 7 symbols except a very last half symbol can be defined as one slot. In this case, the very last half symbol can be defined as guard time for TA.

Embodiment 8

In embodiments 5 to 7, it may not design a DMRS in all subframes currently used in a data region. A DMRS is designed in partial subframes only for the embodiment 5, the embodiment 6, or the embodiment 7 and a different DMRS design can be applied to the remaining subframes. In this case, a receiving vehicle compensates for AGC or a frequency offset in the subframes in which the DMRS for the embodiment 5, the embodiment 6, or the embodiment 7 is designed and applies the AGC or the frequency offset to a different subframe. In this case, a DMRS design considering TA only can be applied to subframes to which the embodiment 5, the embodiment 6, or the embodiment 7 is not applied.

According to the embodiment 8, when a message is transmitted on PSSCH, PSCCH, and PSDCH currently used in D2D, the message can be transmitted over a plurality of subframes. In this case, AGC or a DMRS for a frequency offset can be used for partial subframe only among a plurality of the subframes. In this case, a different DMRS design can be used for the remaining subframes. It may be able to compensate for AGC or a frequency offset of the remaining subframes using a subframe in which the DMRS for the AGC or the frequency offset is used. Information on the subframe in which the DMRS for the AGC or the frequency offset is used can be configured by an eNB via RRC signaling. Or, a transmitting vehicle may dynamically inform a receiving vehicle of the information.

When the embodiment 5, the embodiment 6, or the embodiment 7 is designed, a first half symbol of TTI is used for AGC and a last half symbol is emptied out for TA. The first half symbol of the TTI can transmit a known signal (sequence) or a dummy signal (garbage) for AGC. And, the last half symbol can be emptied out for TA without transmitting a signal.

Figure 21:
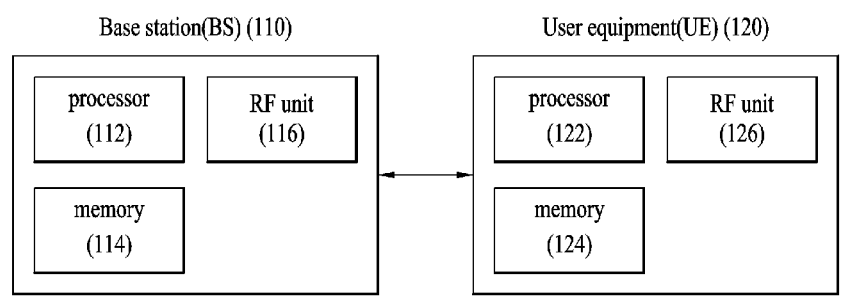
FIG. 21 is a diagram for a base station and a UE applicable to one embodiment of the present invention.

FIG. 21 is a diagram for a base station and a UE applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 21, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of configuring a reference signal for performing V2V communication in a wireless communication system and an apparatus therefor can be applied to various wireless communication systems.

What is claimed is:

1. A method of receiving a reference signal by a V2V device to perform V2V (vehicle-to-vehicle) communication in a wireless communication system, the method comprising:
 performing synchronization with a first synchronization source having a frequency for performing DSRC (dedicated short range communication) as a center frequency; and receiving a reference signal on an OFDM (orthogonal frequency division multiplexing) symbol, which is configured according to a reference signal configuration, from the first synchronization source, wherein the reference signal configuration is defined for frequency compensation according to a hop sync of the center frequency, wherein the reference signal configuration is applied to partial subframes among a plurality of subframes existing in a prescribed time section, and wherein frequency offset compensation according to the partial subframes is identically performed on the remaining subframes except the partial subframes among a plurality of the subframes existing in the prescribed time section.

2. The method of claim 1, wherein the reference signal configuration deploys a reference signal having a length of a half-OFDM symbol to make the reference signal have the same interval in a subframe.

3. The method of claim 1, wherein the reference signal configuration deploys a reference signal having a length of a half-OFDM symbol to make the reference signal have the same interval in a slot.

4. The method of claim 3, wherein the reference signal configuration configures a reference signal interval between continuous slots to be equal to or less than a prescribed range.

5. The method of claim 1, wherein the reference signal configuration continuously deploys a pair of reference signals having a length of a half-OFDM symbol and wherein the V2V device performs frequency compensation according to a phase offset of the continuously deployed pair of reference signals.

6. A V2V device receiving a reference signal to perform V2V (vehicle-to-vehicle) communication in a wireless communication system, comprising:

an RF (radio frequency) unit; and a processor, wherein the processor configured to perform synchronization with a first synchronization source having a frequency for performing DSRC (dedicated short range communication) as a center frequency, the processor configured to receive a reference signal on an OFDM (orthogonal frequency division multiplexing) symbol, which is configured according to a reference signal configuration, from the first synchronization source, wherein the reference signal configuration is defined for frequency compensation according to a hop sync of the center frequency, wherein the reference signal configuration is applied to partial subframes among a plurality of subframes existing in a prescribed time section, and wherein frequency offset compensation according to the partial subframes is identically performed on the remaining subframes except the partial subframes among a plurality of the subframes existing in the prescribed time section.

* * * * *